(No Model.)
W. S. STUYVESANT.
INDICATOR TO PREVENT OVERFLOW OF LIQUIDS IN CLOSED VESSELS.
No. 409,339. Patented Aug. 20, 1889.
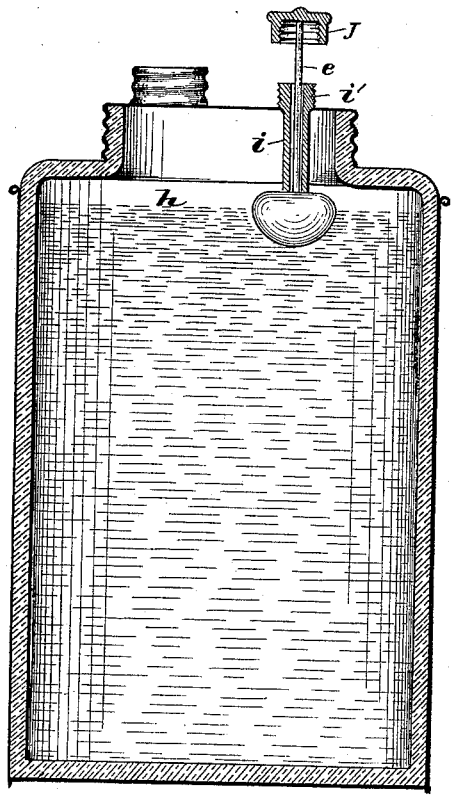
Witnesses:
Inventor
William S. Stuyvesant

UNITED STATES PATENT OFFICE.

WILLIAM S. STUYVESANT, OF ST. LOUIS, MISSOURI.

INDICATOR TO PREVENT OVERFLOW OF LIQUIDS IN CLOSED VESSELS.

SPECIFICATION forming part of Letters Patent No. 409,339, dated August 20, 1889.

Application filed January 21, 1889. Serial No. 296,990. (No model.)

*To all whom it may concern:*

Be it known that I, WILLIAM S. STUYVESANT, a citizen of the United States, residing at St. Louis, in the State of Missouri, have invented a new and useful Improvement in Indicators to Prevent the Overflow of Liquids in Closed Vessels; and I hereby declare that the following is a full, clear, and exact description of the same.

My invention relates to improved means for indicating the level of oil, water, or other liquids while being poured into closed tanks or vessels, and has for its object to prevent the overflow and waste of the liquids which would otherwise occur.

To this end my invention consists in forming an open-ended tube through the closed top of a vessel and combining therewith a rod adapted to work longitudinally through the tube, said rod carrying at its lower end a float which, as the liquid while flowing into the vessel approaches the top thereof, causes the rod to be projected upward to view above the tube and indicates the level of the liquid in the vessel, and at its upper end the rod carries a cap adapted to close the tube when the vessel has been filled.

In the drawing I have shown a vertical section of my invention as applied to a closed vessel containing liquid.

In carrying out my invention I form in the top of any ordinary oil-can or other closed vessel $h$ a guide-tube $i$, the lower end of which extends a short distance into the vessel, and at its upper end it is provided outside the can with a screw-threaded portion $i'$. Passing loosely through the bore of the tube $i$ is a rod $e$, which is provided at its lower end with a float $f$, and at its upper end above the tube with a cap $j$, having a screw-thread formed thereon adapted to engage with the screw-threaded portion $i'$ of the tube $i$. When it is desired to fill the vessel, the cap $j$ is unscrewed from the tube $i$, so as to allow the rod $e$ to move freely in the tube. The liquid is then poured in through an opening provided for the purpose, and as the liquid approaches the top of the vessel the float $f$ will rise, and with it the rod $e$, indicating that the vessel is full. The rod $e$ is then pushed down and the cap $j$ screwed tightly on the upper end of the tube $i$, thereby preventing any leakage at that point.

In some cases it may be found desirable to provide the can with an air-vent to allow the air to enter the can or vessel as the liquid is being drawn therefrom. In such case I provide the tube $i$ with a bore somewhat larger than the rod $e$, so as to leave an air-space surrounding rod $e$; but this is not essential, as an air-vent could be placed at any other part of the vessel.

Having described my invention, what I claim, and desire to secure by Letters Patent, is—

1. In combination with a liquid-receptacle, a stem-tube which projects through the walls thereof into the liquid-chamber, a float arranged in said chamber and provided with a stem whose length exceeds that of the stem-tube and which projects through said tube, and a cap secured to the end of the float-stem and adapted to close the stem-tube, substantially as and for the purposes described.

2. In combination with a closed liquid-receptacle, a tube which projects through the walls thereof, a float having a stem whose cross-sectional area is less than the bore of the tube for purposes of venting the receptacle, and a cap on the outer end of the float-stem adapted to close the stem-tube, substantially as and for the purposes described.

3. In a tank or vessel for holding oil or other liquids, the combination of a tube formed through the top of the vessel and having a screw-threaded portion extending above the tank and a rod working freely through said tube, said rod having a float secured at its lower end inside the tank, and a screw-threaded cap secured to its upper end and adapted to engage the screw-threaded tube and hold the float in its depressed position, substantially as and for the purposes described.

In testimony whereof I affix my signature, in presence of two witnesses, this 18th day of January, 1889.

WILLIAM S. STUYVESANT.

Witnesses:
S. L. SCHRADER,
PAUL BAKEWELL.